US006783587B2

(12) United States Patent
Sethuraman et al.

(10) Patent No.: US 6,783,587 B2
(45) Date of Patent: Aug. 31, 2004

(54) LIGHTWEIGHT WALLBOARD COMPOSITIONS CONTAINING NATURAL POLYMERS

(75) Inventors: Gopalakrishnan Sethuraman, Charlotte, NC (US); Elisha Stav, Charlotte, NC (US); Lambert J. Metz, Tonawanda, NY (US)

(73) Assignee: National Gypsum Properties, LLC, Charlotte, NC (US)

( * ) Notice: Subject to any disclaimer, the term of this patent is extended or adjusted under 35 U.S.C. 154(b) by 33 days.

(21) Appl. No.: 10/241,179

(22) Filed: Sep. 11, 2002

(65) Prior Publication Data

US 2004/0045481 A1 Mar. 11, 2004

(51) Int. Cl.$^7$ .................. C04B 38/10; C04B 28/14; B32B 5/18; B32B 13/08
(52) U.S. Cl. ............... 106/674; 106/779; 428/219; 428/312.4; 428/535
(58) Field of Search ................ 106/674, 729; 428/219, 312.4, 535

(56) References Cited

U.S. PATENT DOCUMENTS

| | | |
|---|---|---|
| 1,776,325 A | 9/1930 | Robinson et al. |
| 2,207,339 A | 7/1940 | Camp et al. ............... 154/2 |
| 3,592,830 A | 7/1971 | Nasser ................. 260/439 |
| 3,989,534 A | 11/1976 | Plunguian et al. ......... 106/86 |
| 4,019,920 A | 4/1977 | Burkard et al. .......... 106/114 |
| 4,156,615 A | 5/1979 | Cukier ................ 106/111 |
| 4,174,230 A | 11/1979 | Hashimoto et al. ...... 106/109 |
| 4,265,964 A | 5/1981 | Burkhart .............. 428/306 |
| 4,350,533 A | 9/1982 | Galer et al. ............ 106/89 |
| 4,502,901 A | 3/1985 | Burkard ................ 156/39 |
| 4,871,395 A | 10/1989 | Sugama ................ 106/88 |
| 4,916,004 A | 4/1990 | Ensminger et al. ....... 428/192 |
| 5,221,386 A | 6/1993 | Ensminger et al. ........ 156/40 |
| 5,277,712 A | 1/1994 | McInnis ............... 106/774 |
| 5,305,577 A | 4/1994 | Richards et al. .......... 52/799 |
| 5,342,566 A | 8/1994 | Schafer et al. .......... 264/102 |
| 5,641,584 A | 6/1997 | Andersen et al. ........ 428/703 |
| 5,879,446 A | 3/1999 | Patel et al. ............ 106/781 |
| 5,879,825 A | 3/1999 | Burke et al. ........... 428/703 |
| 5,888,322 A | 3/1999 | Holland ............... 156/39 |
| 5,922,447 A | 7/1999 | Baig ................. 428/292.7 |
| 6,171,388 B1 | 1/2001 | Jobbins ............... 106/778 |
| 6,221,151 B1 | 4/2001 | Campbell et al. ........ 106/778 |
| 6,251,979 B1 | 6/2001 | Luongo ............... 524/423 |
| 6,342,284 B1 | 1/2002 | Yu et al. ............... 428/70 |
| 6,387,172 B1 | 5/2002 | Yu et al. .............. 106/680 |
| 6,403,688 B1 | 6/2002 | Luongo ............... 524/423 |
| 6,422,734 B1 | 7/2002 | Sethuraman et al. ...... 366/101 |

FOREIGN PATENT DOCUMENTS

| | | | |
|---|---|---|---|
| EP | 1 081 113 A1 | 7/2001 | ........ C04B/28/14 |
| FR | 962 855 A | 6/1950 | ................ 7/1 |
| WO | WO 99/08978 | 2/1999 | ........ C04B/28/14 |
| WO | WO 02/12141 A1 | 2/2002 | ........ C04B/11/00 |

OTHER PUBLICATIONS

Pan, C.S.; Chiou, S.S.; Hsiao, H.; Wassell, J.T.; Keane, P.R., "Assessment of Perceived Traumatic Injury Hazards During Drywall Hanging," Int. Journal of Industrial Ergonomics 1999, 25; 29–37.
Pan, C.S.; Chiou, S.S., "Analysis of Biomechanical Stresses During Drywall Lifting," Int. Journal of Industrial Ergonomics 1999, 23; 505–511.
Pan, C.S.; Chiou, S.S.; Hsiao, H.; Becker, P.; Akladios, M., "Assessment of Perceived Traumatic Injury Hazards During Drywall Taping and Sanding," Int. Journal of Industrial Ergonomics 2000, 25; 621–631.
"Standard Test Methods for Physical Testing of Gypsum Panel Products," ASTM Standard Designation C 473–00; (Mar., 2000.).
PCT Search Report dated (Jan. 29, 2004) PCT/US03/28522.
XP–002267843; English Abstract of JP 55 144458A; (Nov. 11, 1980).

Primary Examiner—David Brunsman
(74) Attorney, Agent, or Firm—Ice Miller; Anthony Nimmo

(57) ABSTRACT

Compositions useful for the preparation of lightweight, high strength wallboards, and methods of making same are disclosed. The composition includes a slurry of calcium sulfate hemihydrate (stucco), water, starch, and a foam. The foam acts to provide large bubbles within the core slurry, thereby lightening the weight of the wallboard. The composition and method provide wallboards having lighter weights compared to standard wallboard, increased core strength, and increased paper-to-core bonding.

43 Claims, No Drawings

LIGHTWEIGHT WALLBOARD COMPOSITIONS CONTAINING NATURAL POLYMERS

FIELD OF THE INVENTION

The present invention relates generally to the field of wallboard, or "drywall" compositions containing natural polymers, and methods for their preparation. More particularly, this invention is directed towards methods of preparation of a wallboard composition that is lightweight and retains its strength, while at the same time maintaining a cost comparable to conventional wallboard. Starch is an inexpensive, widely available natural polymer suitable for use in the present invention. Additionally, this invention relates to the manufacturing processes used to produce the wallboard composition of the present invention.

BACKGROUND OF THE INVENTION

Conventional gypsum wallboard, or "drywall", has been used for over fifty years in the construction industry, specifically in the construction of residential and commercial building interior walls and ceilings. The use of calcium sulfate hemihydrate ($CaSO_4 \cdot \frac{1}{2}H_2O$) as the main ingredient in standard wallboard formulations has remained predominantly unchanged. Typically, such wallboard has consisted of essentially a gypsum core covered with paper bonded to this core. The manufacture of gypsum wallboard is an expensive, tightly controlled manufacturing process, oftentimes entailing elaborate steps with significant environmental concerns and repercussions.

Conventional gypsum wallboard has many advantages, such as its low cost and easy workability in many construction applications. However, a major drawback of conventional wallboard is its weight. Typical gypsum wallboard is approximately ½ inch thick and has a weight of between about 1650 to 1800 pounds per 1,000 square feet of material, or pounds MSF ("MSF", material square feet, is a standard abbreviation in the art for a thousand square feet. It is an area measurement for boxes, corrugated media and wallboard). This heavy weight, coupled with size of typical sheets (4'×8' to 16') and no handholds makes the conventional wallboard both cumbersome and awkward to carry and manipulate. This is especially evident when gypsum wallboard is used in ceiling applications, since the individual sheets must be supported over the installer's head by hand or by some appropriate mechanical means until nails (or other appropriate fasteners) can be employed to secure the wallboard. Not surprisingly, it has been shown that handling massive and bulky wallboard sheets exposes workers to potential hazards and injuries which increases their risk of occupational injury (Pan, C. S., et al., *Int. J. Industrial Ergonomics* 25: 621–631, 2000; Pan, C. S.; Chiou, S. S., *Int. J Industrial Ergonomics* 23: 505–511, 1999; Pan, C. S., et al. *Int. J Industrial Ergonomics* 25: 29–37, 1999).

Issued patents and the technical literature are replete with attempts to formulate lightweight wallboard compositions to provide a lightness in density and weight without sacrificing an undue or unacceptable amount of strength. An industry measure for acceptable strength of wallboard is the pounds of nail pull, or the amount of force required for the board to be pulled over the head of a nail. However, these earlier efforts have often resulted in the addition of substantial manufacturing and/or material costs to the finished products, or lacked the necessary strength for use in wall and ceiling applications. For example, attempts have been made to use a small percentage of synthetic binder in the wallboard formulation to increase strength and lighten the wallboard. However, the amounts of binder required in order to increase or maintain strength has not been cost effective. Other attempts which have included the use of foam as a filler suffered from problems with proper hydration and premature setting of the gypsum when performed on a process scale.

Other reported attempts at preparing lightweight wallboard have proposed the use of adhesive compositions which bind cellulose and other porous materials. U.S. Pat. No. 3,720,633 suggests a polyvinyl alcohol-based adhesive composition for use in paper board compositions. However, no mention or suggestion is made of the need for a specific composition which can bind with gypsum to create a wallboard with a reduced weight over compositions previously described while maintaining the necessary strength characteristics.

U.S. Pat. No. 4,265,964 states that the entrainment of air pockets or bubbles will not produce a lightweight wallboard with the desired strength characteristics. In order to achieve a lightweight wallboard, a cementitious material such as gypsum is mixed with lightweight thermoplastic particles, a soap surfactant, starch to aid in binding, and water in order to produce a mixture which is lightweight and exhibits appropriate strength. However, the use of such particles or beads is expensive and results in a process which is cost-prohibitive in the competitive wallboard marketplace.

A different approach to the preparation of a lightweight wallboard has been proposed in U.S. Pat. No. 4,502,901, wherein by-product gypsum from a flue-gas desulfurization process (FGD gypsum) is used to form a wallboard. Through the use of FGD gypsum, the particle size of the gypsum has been reported to be more easily controlled, allowing for more cost-effective manufacturing processes and a potentially lightweight wallboard with the same strength characteristics as standard wallboard.

U.S. Pat. No. 5,879,825 suggests a method of preparation of high-strength wallboard, as well as core compositions which are suitable for use within such wallboard. The core composition includes a slurry of calcium sulfate hemihydrate, water, and an acrylic polymer which acts as the strengthening agent. The use of a foam within the core slurry controls the density, allowing for the production of a wallboard which has a reduced weight while still providing beneficial strength characteristics.

Alternative solutions for producing lightweight wallboard have been proposed using a perlite filler, such as in U.S. Pat. No. 5,922,447. As suggested therein, a lightweight gypsum board can be prepared by mixing a slurry of gypsum, perlite and a minor amount of starch which acts as a binder for the perlite spheres. However, the nail pull values reported for the wallboard of this invention are in the range of 55–80 pounds, which just meets or falls below the ASTM requirement for gypsum wallboard, which specifies an 77 pound nail pull for a ½-inch board. Such a lightweight board as suggested by this method does not offer the increased strength necessary for commercial use.

U.S. Pat. No. 6,171,38 suggests that a lightweight wallboard can be prepared using a mixture of gypsum, one or more naturally occurring or synthetic latex polymers, and one or more nonionic surfactants in excess. The preferred latex polymer is preferably derived from styrene and acrylic acid monomers, and the nonionic surfactant consists of an alcohol ethoxylate. The use of excess surfactant is suggested to aid in the distribution of the latex, and to help improve the strength characteristics of the resultant wallboard. The amount of nonionic surfactant added is suggested to be crucial to the success of the invention. However, in using such specialized polymers and reagents in the formulation, the cost-effectiveness of this method has yet to be realized.

U.S. Pat. No. 6,403,688 suggests a novel lightweight, strengthened, wallboard comprised of synthetic binders and perlite, as well as methods and apparatus for making such wallboard. The binders bond to the perlite in a manner that creates a strengthened bond and reduces the amount of gypsum need to formulate the composition. Also suggested is a veneer covering which adds to the wallboard's strength while simultaneously increasing the moisture resistance and fire retardency.

Despite these advances and potential solutions, there still exists a need for a high strength, lightweight wallboard product which has the structural integrity to withstand the structural and industrial requirements of traditional, heavyweight wallboard products. Such a strong, lightweight wallboard should also satisfy industry criteria, such as ASTM Method C-36 and C-473, be cost-effective to manufacture, and have a strength at least equal to previously known and disclosed wallboard products while reducing the weight of the wallboard significantly. The present invention is directed toward meeting such criteria.

SUMMARY OF THE INVENTION

In accordance with the present invention, it has been discovered that a composition comprising gypsum hemihydrate (stucco), natural polymer, and a foam is suitable to overcome one or more of the problems described above. That is, the improvements described herein allow for the preparation of wallboard slurry and the corresponding wallboard which is lightweight yet has an improved strength and can be manufactured in such a way as to reduce cost ("cost effective"). Starch is a natural polymer found to be suitable for use in the present invention.

According to one feature of the present invention, calcium sulfate hemihydrate (stucco), water, and an excess amount of starch are combined with a low-density foam solution to produce a core composition in the form of a slurry which has large, stable bubbles. The combination of the starch and the low-density foam produce numerous bubbles which impart lower weight and increased strength in a synergistic manner. Conventional wallboard core ingredients can also be included. The core composition is deposited between two paper sheets and allowed to set in any known manner in order to produce a wallboard product.

Several significant improvements have been made available through the improved wallboard of the present invention. The use of the lightweight manufacturing technology of the present invention allows for a wallboard composition that is significantly lighter in weight than current, traditional heavy gypsum wallboard formulations. To date, reductions in weight of up to about 13% have been achieved, although this is not yet optimized. This reduced weight has additional cost-effectiveness benefits in that transportation costs can be reduced due to decreased weights. Additionally, the installation process is easier and less costly due to the workers now being enabled to handle lighter loads. In a similar aspect, the potential for wallboard-related injuries and accidents to tradesmen and consumers during installation which are associated with standard, heavy wallboard are reduced.

DETAILED DESCRIPTION OF THE INVENTION

The present invention relates to lightweight structural units such as gypsum wallboard and the like. The units contain stucco (calcium sulfate hemihydrate), an excess amount of starch based upon the amount of stucco used, and include a low-density foaming solution suitable to generate large-diameter bubbles within the core slurry. The invention further provides a method of preparation of a gypsum slurry and gypsum wallboard having a lighter weight than conventional wallboards due to the numerous air bubbles and both a high strength to weight ratio and an improved paper to core bond strength through the use of the starch in the core composition.

Most gypsum board is made from natural gypsum (calcium sulfate dihydrate), a mineral which is widely distributed throughout the world. The balance is made from synthetic gypsum sources, such as waste material from flue gas desulfurization operations. Generally, the board making process consists of the following steps:

Gypsum rock is mined and transported to the board mill, where it is dried, crushed to about 50 $\mu$m to about 80 $\mu$m particle size and calcined at about 175° C. in a calcidyne or IMP mill to yield stucco (sometimes referred to as "gypsum in hemihydrate form"). This reaction is as follows:

$$CaSO_4.2H_2O \rightarrow CaSO_4.\tfrac{1}{2}H2O+3/2H_2O\uparrow$$

To convert the stucco (gypsum hemihydrate) back into gypsum material suitable for use in construction applications, the stucco is mixed with additives and water and a pregenerated foam in a "pin" mixer to form a slurry. For the production of gypsum board, the slurry is formed into long continuous sheets between two layers of paper. For molded articles, the slurry is placed in a mold. After wetting of the stucco occurs, the hemihydrate dissolves, needle-like gypsum crystals precipitate, and the crystal mass sets and becomes solid. The setting reaction is as follows:

$$CaSO_4.\tfrac{1}{2}H_2O+3/2H_2O \rightarrow CaSO_4.2H_2O$$

To conclude the process, the sheets are cut, flipped over and dried in large continuous ovens. They are then typically taped face-to-face in pairs and stacked for shipment.

In accordance with the present invention, the primary component of the final composition is gypsum (calcium sulfate dihydrate). However, in order to reduce the density of the final composition while maintaining or even increasing its strength, excess starch and a low-density foam are added during the manufacture of the core slurry composition.

A preferred method process for manufacturing the core slurry composition and wallboard of the present invention includes premixing dry ingredients in a mixing apparatus. The dry ingredients can include any combination of calcium sulfate hemihydrate (stucco), an accelerator, and an anti-desiccant (e.g. GB-33), as described below in greater detail. Excess starch may also be included in this dry mixture.

The dry ingredients are then mixed with a "wet", aqueous portion of the core composition slurry. This may be done by adding the aqueous portion to the dry mixture in the mixing apparatus, or vice-versa. In the instance that the method of the present invention is carried out in a production plant, the dry ingredients are mixed with the aqueous portion in a pin mixer or similar apparatus. The wet, aqueous portion can include a first component (referred to as a "paper pulp solution") that includes a mixture of water, paper pulp, potash, starch, a water-reducing agent, and an accelerator. A set retarder can also be included. The starch can also alternatively be added as a solid to the other dry ingredients, or may be added partly as a solid with the dry ingredients and the remainder added as a component of the paper pulp solution. The paper pulp solution provides a major portion of the water that forms the gypsum slurry of the core composition. A solution of blended "foam" is then prepared and pumped into the system with the other ingredients, or added directly to the paper-pulp solution prior to mixing with the dry ingredients. The mixture of dry and "wet" ingredients produces the core slurry composition.

The produced core composition slurry, following mixing, is deposited between paper cover sheets to form a "sandwich." The core composition is then allowed to cure or "set," whereby the calcium sulfate hemihydrate (stucco) is converted to calcium sulfate dihydrate (gypsum). This end product is wallboard. The wallboard is then preferably dried to remove any excess water not consumed in the reaction of forming the gypsum.

This curing, or "setting," of the stucco produces gypsum crystals which are interwoven to contribute to the strength of the wallboard core. The crystal-to-crystal interaction is important to the final strength of the gypsum wallboard core and end product. The method of the present invention includes an amount of starch in excess of typical amounts used in the art, and in doing so is able to produce a wallboard core slurry and wallboard having increased crystal-to-crystal interactions. This results in a wallboard with increased strength characteristics over those presently available.

One embodiment of the invention is directed towards slurry compositions that can be used in the preparation of lightweight wallboard cores. The slurry can generally comprise, consist essentially of, or consist of calcium sulfate hemihydrate, starch, foam, and water.

Calcium sulfate hemihydrate ($CaSO_4 \cdot \frac{1}{2}H_2O$) is commonly referred to as "stucco." There are two forms of calcium sulfate hemihydrate: the α-hemihydrate form and the β-hemihydrate form. These two types of stucco are often produced by different means of calcination. Either type of calcium sulfate hemihydrate is suitable for use with the invention. Presently the β-hemihydrate form of calcium sulfate hemihydrate is preferred due to its lower cost.

Generally any amount of calcium sulfate hemihydrate can be used in the slurry. The calcium sulfate hemihydrate typically is about 30 weight percent to about 60 weight percent of the slurry. Specific weight percentages are about 30 weight percent, about 35 weight percent, about 40 weight percent, about 45 weight percent, about 50 weight percent, about 55 weight percent, or about 60 weight percent. Ranges from any one listed weight percent to another listed weight percent can be used, for example about 45 weight percent to about 55 weight percent of the slurry or by dry weight of the board formulation.

The weight ratio of water to stucco (w/s) can generally be any weight ratio (i.e. weight of water divided by weight of stucco). At high water-to-stucco ratios, more energy and time is required to dry the produced wallboard. At low ratios, the slurry can be difficult to pour, and may harden prematurely. In order to simplify processing and handling, example ratios include about 0.5, about 0.6, about 0.7, about 0.8, about 0.9, about 1.0, about 1.1, about 1.2, about 1.3, about 1.4, and about 1.5. Ranges of ratios from any one listed ratio to another listed ratio can be used, for example about 0.5 to about 1.5, about 0.7 to about 1.2, and about 0.8 to about 1.0. While generally any range can be used, a presently preferred range of water-to-stucco ratio is about 0.70 to about 0.95.

Generally any type of starch can be added to the slurry. The starch may be in form of dry, powdered starch, such as Gypset or Staley Wallboard (WB) Binder® (an acid modified, viscosity modified dent corn starch, available from A.E. Staley Manufacturing Co.), or it can be prepared and added as a cooked slurry. Starch can be obtained from any source, such as from corn, waxy maize, potato, cassava, sorghum, arrowroot, wheat, tapioca, or rice. The cooked starch can be prepared by making a dispersion of water and starch and heating to 165° F. (73.8° C.). This cooked starch dispersion is retained separately until needed. At the point of addition, the cooked starch dispersion is added to the pulp solution and mixed. Alternatively, the cooked starch is added to the dry stucco mixture. This pulp/cooked starch solution is then added to the dry wallboard ingredients. If the cooked starch is not used, the starch is preferably added to the pulp solution, or alternatively it can be added to the stucco mixture as a dry feed.

Generally any amount of starch can be added to the slurry. It is presently preferred that the starch be added in at least about 1.5 weight percent based on the weight of calcium sulfate hemihydrate. Specific examples of the amount of starch include about 1.5 weight percent, about 1.6 weight percent, about 1.7 weight percent, about 1.8 weight percent, about 1.9 weight percent, about 2.0 weight percent, about 2.1 weight percent, about 2.2 weight percent, about 2.3 weight percent, about 2.4 weight percent, about 2.5 weight percent, about 2.6 weight percent, about 2.7 weight percent, about 2.8 weight percent, about 2.9 weight percent, about 3.0 weight percent, about 3.1 weight percent, about 3.2 weight percent, about 3.3 weight percent, about 3.4 weight percent, about 3.5 weight percent, about 3.6 weight percent, about 3.7 weight percent, about 3.8 weight percent, about 3.9 weight percent, and about 4.0 weight percent. Generally any range of amounts from any one listed weight percent to another listed weight percent can be used, for example, about 1.5 weight percent to about 3.5 weight percent, or about 2 weight percent to about 3 weight percent. A presently preferred range is about 1.7 weight percent to about 2.5 weight percent. A further presently preferred amount of starch is about 2.1 weight percent. Use of starch in excess of 4 weight percent is possible, but is currently cost prohibitive.

A foam solution is added in order to introduce numerous air voids, or bubbles, into the core of the wallboard. The foam contains very little solid material, but due to its composition is able to resist breakdown during mixing operations. Consequently, the density, and therefore the overall weight, of the wallboard core can be controlled by incorporating these bubbles into the slurry.

The foam solution can have a set foam density (as measured prior to addition to the slurry). The density can generally be any density. Specific examples of the foam density include about 7 pounds per cubic foot, about 8 pounds per cubic foot, about 9 pounds per cubic foot, about 10 pounds per cubic foot, about 11 pounds per cubic foot, about 12 pounds per cubic foot, about 13 pounds per cubic foot, about 14 pounds per cubic foot, about 15 pounds per cubic foot, about 16 pounds per cubic foot, about 17 pounds per cubic foot, about 18 pounds per cubic foot, about 19 pounds per cubic foot, and about 20 pounds per cubic foot. Generally any range of densities from any one listed density to another listed density can be used, for example, about 7 pounds per cubic foot to about 20 pounds per cubic foot, or about 8 pounds per cubic foot to about 10 pounds per cubic foot. A presently preferred range is about 8 pounds per cubic foot to about 9.5 pounds per cubic foot. The foam can be a low-density foam or a high density foam. The foam can be a stable foam or an unstable foam. It is presently preferred that the foam be a low-density unstable foam, as this aids in the generation of larger size air bubbles within the slurry and large air voids in the final cured wallboard product.

Generally any foam can be added to the slurry composition. Foams are generally prepared using water, a foaming agent, and air or other gas. Any of the known frothing agents, or "foaming agents" can be employed as a surfactant in the practice of the present invention. The term "foaming agent", as used herein, means a substance that can introduce gas bubbles into the compositions of the present invention. Typical foaming agents are anionic, nonionic, or cationic surfactants. In particular, the class of anionic substances comprising organosulfonates or organosulfates may be employed. Typically, these include the alkylaryl sulfates or alkylaryl sulfonates, for example, ammonium salts of alkylbenzenesulfonates, lauryl sulfate or alkylglycolether sulfate. The alkyl groups may be linear or branched. More preferable for use with the present invention are ammonium ether sulfates, such as Cedepal™ FA-406 and Alpha Foamer™ which are commercially available from Stepan Company. The foaming agent, in accordance with the present invention, is preferably used at a level necessary to make foam of low density.

Generally, any amount of foaming agent can be mixed with water and added into the slurry. The foaming agent can be measured as a weight percent based on the calcium sulfate hemihydrate. Examples of weight percents suitable with the present invention include about 1%, about 2%, about 3%, about 4%, about 5%, about 6%, about 7%, about 8%, about 9%, about 10%, about 20%, about 30%, about 40%, and about 50%. Generally any range of weight percents from any one listed weight percent to another listed weight percent can be used, for example, about 10 weight percent to about 50 weight percent, or about 15 weight percent to about 45 weight percent. A presently preferred range is about 20 weight percent to about 40 weight percent, and more preferably about 30 weight percent to about 40 weight percent.

The foam solution is preferably made of a combination of two ammonium ether sulfates, specifically Alpha Foamer™ and Cedepal™ FA-406. It is preferred that the combination of surfactants be in a ratio such that one is in excess of the other, and more preferably that the ratio of surfactants be at least two to one (w/w). More preferably, the surfactants in the foam solution are in the ratio of at least five to one (w/w). Most preferably, the surfactants in the foam solution are in a ratio of nine to one, w/w (e.g. 90 grams of Alpha Foamer™: 10 grams of Cedepal™ FA-406).

The foam can be generated by any method known to those of skill in the art which will allow a foam of a set density to be prepared. Preferably, the foam is generated by the cup method, and more preferably it is generated using a static foam generator. In the instance that the cup method is utilized, a known quantity of surfactant solution is placed in a cup-like container, water is added to a certain volume, and the solution mixed for 1–2 minutes on a mixer. In this manner, a foam solution is generated with a foam volume and foam density dependent upon the amount of surfactant and the amount of water mixed, as well as speed of mixing. While suitable for laboratory experiments, it can be difficult to accurately control the foam density using this method in a process scenario.

A similar, but more accurate, method of foam generation suitable for use with the present application is a "static foam generation" method, such as that described in U.S. Pat. No. 6,422,734. In this method, a feed line having water passing through it has a known volume of "soap" (foaming agent) solution injected into it followed by the injection of air at a set rate. In this manner, foam is generated with a set density. The advantage of this method of foam-generation is that adjusting the airflow, water flow and soap solution flow can accurately control the foam density. For example, using a low water flow rate of 1.65–1.70 gal/min and an air flow rate of 0.6–0.65 cfm, soap solution in accordance with the invention is injected using an adjustable injector at a setting of 6, resulting in a low density, unstable foam with a bubble size of 400–500$\mu$.

The foam solution permits the entrainment of an appropriate amount of air within the slurry to form a stable, enduring foam, which will aid in forming a lightweight wallboard. It is equally important that the foam be provided on a controlled basis in order to avoid air cavities in the final product. In the final core slurry, the foam incorporates numerous air bubbles into the slurry which result in numerous air voids in the final product. The resultant bubbles have an average size of about 200$\mu$ to about 500$\mu$, more preferably 300$\mu$ to 400$\mu$, and as such are optimal for use in accordance with forming a lightweight wallboard of the present invention.

Wallboards prepared using the slurry compositions described herein will preferably have a reduced density relative to a standard wallboard of half inch thickness. The reduction can be about 10 pounds/MSF, about 20 pounds/MSF, about 30 pounds/MSF, about 40 pounds/MSF, about 50 pounds/MSF, about 60 pounds/MSF, least about 70 pounds/MSF, about 80 pounds/MSF, about 90 pounds/MSF, about 100 pounds/MSF, about 110 pounds/MSF, about 120 pounds/MSF, about 130 pounds/MSF, about 140 pounds/MSF, about 150 pounds/MSF, about 160 pounds/MSF, about 170 pounds/MSF, about 180 pounds/MSF, about 190 pounds/MSF, about 200 pounds/MSF, or greater than about 200 pounds/MSF. The use of starch and foam can reduce the density of the produced wallboards while maintaining sufficient board strength and other physical properties.

Other dry ingredients can be included within the core and core slurry of the wallboard composition, including an accelerator which can be used to control, within certain limits, the crystal growth rate and set time of the stucco. Examples of suitable accelerators which can be used in accordance with the present invention include ball mill accelerators ("BMA"; a mixture of gypsum and starch in a 1:1 ratio) and potassium sulfate ("potash"), although many other suitable accelerators are known in the art. Other suitable accelerators include, for example, NaOH, CaO, Ca(OH)$_2$, CaCl$_2$, Na$_2$CO$_3$, finely ground gypsum and the like. As a preferable aspect of the present invention, the accelerator is a mixture of BMA and potash, in a ratio of about 2:1 to about 8:1. Specifically, the ratio of BMA to potash is about 1.0 to about 3.0 grams BMA:about 0.4 to about 0.5 grams potash. The amount of BMA and potash used depends upon the drying profile. For example, about 3.3 grams of BMA and 0.4 grams of potash per MSF have been used in the laboratory, while about 6 pounds to about 7 pounds of BMA and about 1.46 pounds of potash per MSF have been used in pilot plant studies.

Retarders can be used in conjunction with the present invention. Retarders are used to adjust the delay time of the setting reaction until after the stucco/water slurry has been formed into a sheet. This eliminates or reduces the plugging of the pin mixer with gypsum crystals during the board manufacturing process. Suitable retarders, in accordance with the present invention, are polymers, although phosphates, sodium salts, proteins, and the like are also acceptable. Preferably, the retarder of the present invention is at least one of a sodium salt of polyacrylic acid, an acrylic acid sulfonic acid copolymer, an ammonium salt of an acrylic acid sulfonic acid copolymer, a sodium salt of an acrylic acid sulfonic acid copolymer, or a blend of an acrylic acid polymer with a sulfonic acid copolymer and salts thereof. Representative examples of suitable retarders according to the present invention include but are not limited to Accumer™, such as Accumer™ 9000, Accumer™ 9300 and Accumer™ 9400, all of which are trademarks of Rohm & Haas.

An aqueous slurry or solution of paper pulp can also included within the core slurry composition. The pulp solution comprises water and paper fibers ("paper pulp"), and may also include an accelerator such as Accumer and/or a retarder such as potash. About 0.2% to about 0.3% pulp solution based on stucco weight has been used. The retarder can be used in conjunction with the aforementioned accelerator in order to direct the set time of the core composition. Retarding agents are typically used in very low amounts. For example, the amount of retarder can be about 0.005 weight percent to about 0.008 weight percent, based on the dry weight of the core composition. A specific example of the amount of retarder can be about 0.007 weight percent.

The paper pulp solution can also include one or more of a number of additives that serve to increase the fluidity of the slurry and/or alternately reduce the water requirements of the slurry. Materials used as water-reducing agents, in accordance with the present invention, include compounds such as GB-33 (available from Geo Specialty Chemicals), and serve to aid in cutting the costs associated with drying the boards, thereby making the process more economical reducing the overall price of the boards. These water reducing agents, and/or fluid-enhancing agents, may be in solid or liquid form. Agents that are supplied as liquids can be incorporated into the pulp solution directly, or added directly to the mixing operation within the mixing apparatus. Agents that are supplied as solids can likewise be added to the pulp solution, or added to the dry reagents. Examples of suitable water reducers for use in this invention include polycondensation products based on naphthalene or alkyl-naphthalene sulfonic acids, sulfonated melamine formaldehyde resins, copolymers with maleic acid, unsaturated dicarboxylic acid derivatives, oxyalkylene glycol alkenyl ethers and the like.

The paper pulp solution can be prepared by blending or mixing the above described ingredients with water in a blending apparatus, such as a Hobart mixer or a pin mixer. Alternatively, a concentrated pulp solution using only a minimal amount of water can be produced. In this case, the remainder of the core mix water required is made up by addition from a separate water source. The mixing is conducted at a rapid rate (shear rate) of mixing. Preferably, high shear mixing "pulps" the materials, thereby forming a homogenous solution or slurry. The pulp solution can then be transferred to a holding vessel, from which it can be continuously added to the core composition solids mixture as needed. The paper fibers in the pulp solutions serve to enhance the flexibility of the gypsum wallboard. Gypsum wallboard made without such paper fibers is typically very brittle and more susceptible to breakage during handling and transportation. The paper fibers also aid in the evenness of the drying process during the manufacture of the wallboard, as well as enhancing the ability of the completed wallboard product to accept and hold nails or other fastening devices during installation.

Other conventional additives that can be employed in the practice of the invention in customary amounts to impart other desirable properties and to facilitate manufacturing, include, for example: set accelerators, set retarders, recalcination inhibitors, binders, adhesives, dispersing aids, leveling or nonleveling agents, thickeners, defoamers, bactericides, fungicides, pH adjusters, colorants, reinforcing materials, fire retardants, water repellants, fillers and mixtures thereof. The amounts of these optional additives to be included are considered to be within the skill of those in the art. In practice, these additives are typically used in amounts of less than one part by weight per 100 parts per weight of stucco.

The gypsum wallboard prepared by the methods disclosed herein is characterized by having a dry weight of less than about 1560 pounds/MSF (pounds per thousand square feet) for a ½-inch thick board (corresponding to a density of about 0.64 gm/cm$^3$). The wallboard preferably has a dry board weight of about 1000 pounds/MSF to about 1560 pounds/MSF for a ½-inch thick board (about 0.39 gm/cm$^3$ to about 0.64 gm/cm$^3$), and more preferably the wallboard has a dry board weight of about 1450 pounds/MSF for a ½-inch thick board to about 1560 pounds/MSF for a ½-inch thick board (about 0.57 gm/cm$^3$ to about 0.64 gm/cm$^3$). The wallboard of the invention also satisfies the criteria of current (2002) ASTM Methods C-36 and C-473.

The lightweight wallboards of the present invention can be prepared by methods known to those skilled in the art. In one embodiment, stucco (calcium sulfate hemihydrate) slurries incorporating the improvements and ingredients of the present invention are prepared in a special mixer, such as a pin mixer of the type described in U.S. Pat. No. 4,606,647.

Stucco is fed into the top of the pin mixer along with the other dry components. Pulp water containing the paper, excess starch, potash, water reducer, and retarder is added through another port, and low-density unstable foam prepared using the "static foam generator" method is added through another at a specific rate. Additional components may be added with the pulp water and other aqueous components, or separately. The residence time for the components within the mixer is generally very short.

For the manufacture of wallboard, the stucco slurry is discharged to a chute which spreads it on a moving paper sheet which is slightly wider than the desired board. A top sheet of paper is then placed on the slurry and rollers with guides form it to the desired thickness and width. The board then travels along rollers for several minutes, during which time the setting reaction occurs and the boards stiffen. The boards are then cut into length and fed into a large, continuous oven for drying.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

Sample Slurry Formulations

General ranges of ingredients used in the wallboard of the present invention (excluding optional additives) are shown in Table I below, including a sample formulation. All ranges in Table I are given as weight percent based on the amount of stucco added, except for the range of stucco which is given as a weight percent of the slurry formulation.

TABLE I

| Ingredient | Exemplary Range | Sample Formulation |
| --- | --- | --- |
| Stucco (CaSO$_4$-½ H$_2$O) | 30–60 wt. % | 783 g |
| Accelerator | 0.02–4.0 wt. % | 2.95 g |
| Starch | 1.5–2.5 wt. % | 16.5 g |
| Retarder | 0.0–0.2 wt. % | 0.8 g |
| Paper Pulp | 0.05–0.5 wt. % | 1.8 g |
| Pulp water | 20–70 wt. % | 520 mL |
| Foam solution (soap + water) | 20–40 wt. % | 1375 mL (0.3–0.5 g soap + H$_2$O) |
| Water inhibitor | 0.01–0.5 wt. % | 2.7 g |

Example 2

Preparation of Wallboards

All of the tested wallboards were made using core formulations similar to the general formula presented in Table I, and included calcium sulfate hemihydrate, pulp, and water. The inventive formulations also included starch and a lightweight foam solution. The formulations could include an accelerator and a retarder. The starch was added with pulp water, or could be added directly to the stucco dry mixture. The foam solution could be added either with the pulp water, or added to the dry mixture. The produced core compositions, or slurries, were cast into paper "envelopes" representing commercial paper covering sheets to form sample "boards." Following casting of the boards, they were dried in a commercial board-drying kiln until almost dry. Drying was finished in a 104° F. (40° C.) forced-air oven. This drying step assured that the drying process did not cause surface calcination which might effect testing.

Example 3

Nail Pull Assays

Comparative testing of the inventive compositions and standard compositions was performed. One manner in which to measure the strength of a wallboard product is a nail pull test, performed according to ASTM C-473 ("Physical Testing of Gypsum Wallboard Products"). This test requires a minimum-pull force value of 80 pounds or pounds-force in order to produce a satisfactory ("passing") product if iron-horse equipment is used. The requirement is 77 pounds or pounds-force if ATS equipment is used. Pilot plant measurements reported herein were determined with iron-horse equipment, while laboratory measurements reported herein were determined with ATS equipment.

Generally, various gypsum wallboard control samples were made using standard amounts of additives and components. Gypsum wallboards made in accordance with the invention used about 2.1 wt. % of starch (Staley WB Binder) based upon the amount of calcium sulfate hemihydrate used. The amount of low-density foam added, as well as the foam's water-to-stucco ratio, were varied and the size of the bubbles generated by these modifications within the slurry were measured.

Minimum board weights required to meet the ASTM C-473 standard were determined. Four different sources of stucco were used. The provided board weights, or densities, are given in pounds per 1,000 square feet of one-half inch thick board and are shown in Table II. Nail pull values represent the average of ten individual nail pulls.

TABLE II

| Starch emulsion | Amount of starch (% starch based on amt. of stucco) | Approximate lowest board weights to attain 77 lb. feet for Nail Pull (1/2" board) |
| --- | --- | --- |
| Control lacking excess starch | 0.6% | 1635 |
| Wallboard A (TAM stucco) | 2.0% | 1500 |
| Wallboard B (SAV stucco) | 2.1% | 1451 |
| Wallboard C (Baltimore IMP stucco) | 2.1% | 1500 |
| Wallboard D (NTL stucco) | 2.1% | 1560 |

As indicated above, the control boards were able to achieve satisfactory nail pull results (77 pounds of force) with minimum board weights of 1635 pounds/MSF of half inch board. In contrast, wallboards made in accordance with the present invention were able to achieve 77 pounds of force for the nail pull test with minimum boards weights of 1560 pounds/MSF ("Wallboard D") down to as low as 1450 pounds/MSF ("Wallboard B"). These represent a reduction in weight of 5% to 11%. These results also indicate that the source of the stucco used, in addition to the quality-of the stucco, can influence the end characteristics of the wallboard product.

Example 4

Pull Force Test Procedures

Boards prepared in the laboratory were evaluated using the following assay. The 90° pull force test ("PF@90/90") measures the relative strength of the paper-to-core bond at the paper-core interface. After standing in 90% relative humidity environment for two hours, the paper surface of the wallboard is scored using a utility knife into a 1 inch wide strip, 4 inches long in the direction of the paper edge. A second cut is scored in the end core 1/16 inch below the paper-core interface to a depth of ¼ inch. This creates a ¼ inch by 1 inch "tab" in the end of the board that is bent up for attachment to the pulling instrument.

One edge of the tab remains attached to the wallboard. A clamp is secured to the face paper "tab," and an instrument is used to pull up on the tab at a 90° angle to the board until the tab fails. The force applied at the failure point is then recorded in ounces. A "Percent Bond" (or "% Bond") value is then determined for each 90° pull force test, and an estimate of the amount of bond remaining after each test.

Boards prepared in a plant were evaluated using the following procedure. A one foot square (30.5 cm square) section of board is placed horizontally on a support. The surface is scored, and the paper layer is removed. The percentage of material adhered to the board (i.e. not peeled off) is measured.

Example 5

Preparation and Testing of a Slurry Containing TAM Stucco and Cooked Starch A sample was prepared by dry blending: 697 g of TAM stucco (Tampa Stucco, from a National Gypsum mine in Nova Scotia); 4.0 g of cooked starch (Staley WB Binder starch); and 25.4 g of a set accelerator comprising a mixture of BMA (25 g) and potash (0.4 g) that has been finely ground. Simultaneously, a low-density foam solution (1450 mL) was generated using the static foam generation method comprising a 90% formulation of Alpha Foamer/Cedepal FA-406. A pulp solution was prepared by mixing 203 mL of water (70° F. (21° C.)), 1.6 g paper, 12.0 g of Staley WB Binder starch, and 2.4 g of water-reducing agent (GB-33) in a large WARING blender for about 40 seconds. The pulp solution thus formed was added, along with the foam solution, to the dry stucco mixture and the slurry mixed for 11 seconds at high speed. The resultant slurry was poured into a paper envelope mold formed from Milton Lab Standard paper to prepare ~0.5" thick square sheets (1'×1' square). After allowing the calcium sulfate hemihydrate (stucco) to set to form gypsum (approximately 3 minutes, 25 seconds), the boards were removed from the molds and dried in a 104° F. (40° C.) forced-air oven for over 85 minutes, until the weight remained constant. The boards were then cut, analyzed, and measured for strength using the Nail Pull measurement.

The board prepared in this manner had the following characteristics: dry board weight: 1470 lb/MSF; caliper size: 0.506 inches; w/s (water-to-stucco ratio)=0.83; ASTM Nail Pull: 81.4 lbs.; average bubble diameter within the core: 300–400$\mu$.

This experiment was repeated several times, maintaining the inclusion of both low-density foam and an excess amount of starch relative to the weight of calcium sulfate hemihydrate. However, the starch used (Staley WB Binder) was uncooked, and was added to the pulp water solution. In particular, the amount of excess starch was held constant at about 2.1 weight percent, while the amount of foam added to the core slurry was varied. These results are shown in Table III. From this data, it is apparent that a wallboard having an excess amount of starch of approximately 2.1 weight percent and at least about 20 weight percent foaming agent is lighter in weight than standard wallboard while maintaining the necessary strength characteristics.

90% formulation of Alpha Foamer/Cedepal FA-406 (250 g) injected into the foam generation system at soap-pump setting 6 with a water-flow rate of 1.5–1.6 gal/min, and an air flow of about 0.7 cfm. A pulp solution was prepared by mixing 364 mL of tap water (70° F. (21° C.), 1.8 g of paper, 12.0 g of Staley WB Binder starch, 0.8 g of retarder (Accumer, 5% solution), 7.2 g of styrene-butadiene polymer resin (SBR), and 2.7 g of water-reducing agent (GB-33) in a large WARING blender for about 40 seconds. The pulp solution thus formed was added, along with the foam solution, to the dry stucco mixture and the slurry mixed for 11 seconds at low speed. The resultant slurry was poured into a paper envelope mold formed from Milton Lab Standard paper to prepare ~0.5" thick square sheets (1'×1' square). After allowing the calcium sulfate hemihydrate (stucco) to set to form gypsum (approximately 3 minutes, 35 seconds), the boards were removed from the molds and dried in a 104° F. (40° C.) forced-air oven for over 37 minutes, or until the weight remained constant. The dry boards were then cut, analyzed, and measured for strength using the Nail Pull measurement.

The board prepared in this manner had the following characteristics: dry board weight: 1467 lb/MSF; caliper size: 0.505 inches; w/s (water-to-stucco ratio)=0.93; ASTM Nail Pull: 80.7 lbs.; average bubble diameter within the core: 600–700$\mu$. This data illustrates that the inventive sample board exhibits notably increased strength over standard boards, while simultaneously having a lower density (decrease of 170 lb/MSF).

Example 7

Preparation and Testing of a Slurry Containing SAV Stucco

The same procedure as in Example 5 was followed, except this time Savannah Stucco (SAV) from Savannah,

TABLE III

| Trial No. | Amt. Stucco | Wt. % Starch | Wt. % foam solution | Board wt. (lb/MSF) | Bubble size ($\mu$) | w/s | N/P (avg.) (lbs. force) |
|---|---|---|---|---|---|---|---|
| Control | 870 | 0.5 | 18.0 | 1665 | — | 0.86 | 73.5 |
| TAM 1 | 783 | 2.1 | 16.6 | 1701 | 400 | 0.891 | 86.8 |
| TAM 2 | 783 | 2.1 | 17.6 | 1570 | 200–300 | 0.901 | 76.8 |
| TAM 3 | 783 | 2.1 | 20.2 | 1609 | 400–500 | 0.882 | 83.2 |
| TAM 4 | 783 | 2.1 | 23.2 | 1470 | 300–400 | 0.900 | 78.8 |
| TAM 5 | 783 | 2.1 | 25.4 | 1463 | 300 | 0.890 | 67.8 |
| TAM 6 | 783 | 2.1 | 28.1 | 1650 | 200–300 | 0.883 | 90.7 |
| TAM 7 | 783 | 2.1 | 28.2 | 1612 | 400–500 | 0.918 | 87.8 |
| TAM 8 | 783 | 2.1 | 29.8 | 1677 | 400–500 | 0.863 | 88.3 |
| TAM 9 | 783 | 2.1 | 30.9 | 1679 | 300–400 | 0.871 | 85.6 |
| TAM 10 | 783 | 2.1 | 31.0 | 1679 | 300–400 | 0.871 | 85.6 |
| TAM 11 | 783 | 2.1 | 32.0 | 1514 | 300–400 | 0.930 | 79.2 |
| TAM 13 | 783 | 2.1 | 32.2 | 1543 | 400–500 | 0.913 | 81.3 |

Example 6

Preparation and Testing of a Slurry Containing TAM Stucco and Cooked Starch

A sample was prepared by dry blending: 783 g of TAM stucco, 4.5 g of cooked starch (Staley WB Binder starch), and 1.90 g of a set accelerator comprising a mixture of BMA (1.35 g) and potash (0.45 g) which has been finely ground. Simultaneously, a low-density foam solution (1375 mL) was generated using the static foam generation method previously described in U.S. Pat. No. 6,422,734, comprising a Ga. was used, and no cooked starch was incorporated. The stucco was blended with the BMA, and to this was added the pulp water containing the starch. Foam (Cedepal, ~33 wt. %) was added, and the slurry mixed for 14 seconds on high in a mixer, then poured into a board as before. The board prepared in this manner had the following characteristics: dry board weight: 1451 lb/MSF; caliper size: 0.507 inches; w/s=0.87; ASTM Nail Pull: 79.7 lbs.

Example 8

Preparation and Testing of Slurries Containing SAV Stucco and Varying Amounts of Low-density Foam The same procedure as described in Example 7 above was followed, except that the amount of foaming agent relative to the weight of calcium sulfate hemihydrate was varied while maintaining the amount of starch in an amount typical of standard wallboards known in the art (about 0.5 wt % relative to the weight of stucco). The effects on board weight and board strength, as measured by the nail pull test, were examined. These results are shown in Table IV. It is evident that by maintaining the starch composition in an amount standard in commercial wallboard preparation while simultaneously adding various amounts of low-density foam, a board with a lighter weight but with acceptable strength characteristics can be made.

TABLE IV

| Trial No. | Amt. Stucco | Wt. % Starch | Wt. % foam solution | Board wt. (lb/MSF) | w/s | N/P (avg.) |
|---|---|---|---|---|---|---|
| SAV 1 | 783 | 0.5 | 35.8 | 1410 | 0.818 | 54.6 |
| SAV 2 | 783 | 0.5 | 32.6 | 1492 | 0.857 | 89.2 |
| SAV 3 | 870 | 0.5 | 25.0 | 1706 | 0.861 | 78.68 |
| SAV 4 | 870 | 0.5 | 28.3 | 1572 | 0.869 | 71.74 |
| SAV 5 | 870 | 0.5 | 30.3 | 1741 | 0.842 | 86.3 |
| SAV 6 | 783 | 0.5 | 31.4 | 1689 | 0.872 | 91.0 |
| SAV 7 | 783 | 0.5 | 33.7 | 1653 | 0.892 | 85.4 |
| SAV 8 | 783 | 0.5 | 36.0 | 1548 | 0.893 | 79.1 |

Example 9

Preparation and Testing of a Slurry Containing Baltimore IMP Stucco and Uncooked Starch The same procedure as described in Example 5 was followed, except that the stucco was Baltimore IMP (Impact Milling Process) stucco from Nova Scotia that is prepared by the impact milling process, and the starch (uncooked) is added in situ. The board prepared in this manner had the following characteristics: dry board weight: 1509 lb/MSF; caliper size: 0.505 inches; w/s (water-to-stucco ratio)=0.87; bubble size: 300–400$\mu$; ASTM Nail pull: 81.6 lb.

Example 10

Preparation and Testing of Slurries Containing Baltimore IMP Stucco and Variant Amounts of Uncooked Starch and Low-density Foam The same procedure as described in Example 9 was followed, except the amount of starch (uncooked) added to the pulp solution was varied from about 0.5 weight percent to about 3.0 weight percent based on the weight of the calcium sulfate hemihydrate used. Simultaneously, the amount of foaming agent to be added to the foam solution was varied from about 25 weight percent to about 40 weight percent, based on the weight of the calcium sulfate hemihydrate. The boards produced were evaluated for weight, bubble size, and nail pull strength. These results are shown in Table V, where board weight is pounds per MSF of a ½-inch board. These results show that a board of the invention having an amount of excess starch at least about 1.5 weight percent of the amount of stucco and an amount of foam at least about 25 weight percent of the amount of stucco will have the desired improved strength and weight characteristics.

TABLE V

| Trial No. | Amt. Stucco (grams) | Wt. % Starch | Wt. % foam solution | Board wt. (lb/MSF) | Bubble size ($\mu$) | w/s | N/P (avg.) (lbs. force) |
|---|---|---|---|---|---|---|---|
| Balt 1 | 783 | 0.5 | 36.5 | 1517 | — | 0.70 | 69.6 |
| Balt 2 | 697 | 0.7 | 38.7 | 1415 | 300–400 | 0.868 | 61.4 |
| Balt 3 | 697 | 1.18 | 40.0 | 1457 | 300–400 | 0.832 | 74.7 |
| Balt 4 | 697 | 1.54 | 39.8 | 1537 | 300–400 | 0.826 | 78.4 |
| Balt 5 | 697 | 1.50 | 25.5 | 1567 | 300–400 | 0.871 | 81.8 |
| Balt 6 | 697 | 1.72 | 39.5 | 1562 | 300–400 | 0.826 | 81.4 |
| Balt 7 | 697 | 2.0 | 40.4 | 1470 | 300–400 | 0.836 | 72.0 |
| Balt 8 | 697 | 2.1 | 30.7 | 1448 | 300–400 | 0.849 | 67.78 |
| Balt 10 | 783 | 2.1 | 25.5 | 1506 | 250–300 | 0.829 | 77.4 |
| Balt 11 | 783 | 2.1 | 25.6 | 1517 | 300–400 | 0.830 | 87.7 |
| Balt 12 | 783 | 2.1 | 26.1 | 1509 | 300–400 | 0.875 | 81.6 |
| Balt 13 | 783 | 2.7 | 26.2 | 1543 | 400 | 0.840 | 82.5 |

Example 11

Preparation and Testing of a Slurry Containing National City Stucco

The same procedure as described in Example 5 above was followed, except the stucco used was National City Stucco from the National City Mine in National City, Mich., and the added starch was uncooked and added in situ to the pulp solution. The board prepared using this stucco had the following characteristics: dry board weight: 1564 lb/MSF; caliper size: 0.508 inches; w/s (water-to-stucco ratio)=0.87; bubble size: 300$\mu$; ASTM Nail Pull: 78.8 lbs.

Example 12

Nail Pull Assays of Laboratory Samples

Laboratory prepared samples of typical paper-covered gypsum boards produced in accordance with the invention were compared with control boards in regard to nail pull resistance. Nail pull resistance is a measure of a combination of the strengths of the board's gypsum core, its paper cover sheets, and the bond between the paper and the gypsum. The test measures the maximum force required to pull a nail with a head through the board until major cracking of the board occurs, and is carried out in accordance with ASTM C473-95.

All of the test boards were made using the core slurry formulation according to Table I, and included at least stucco, excess starch, low-density foam, pulp, and pulp-water. The formulations could also include an accelerator and a retarder. The excess starch was added either with the pulp water, with the dry components, or a combination of both. Slurries were prepared in accordance with the present invention by mixing the dry components in a HOBART or similar mixer, adding the pulp water solution, and then further mixing for 11 seconds at high speed.

The slurries thus formed were cast into paper "envelopes" to prepare flat gypsum board samples, each having dimensions of about 1 foot×1 foot (about 30.5 cm×30.5 cm). The paper on both surfaces was Milton Lab Standard CF paper, typical of papers employed to prepare paper-covered gypsum board in the industry. Each board was then held in a drying oven at a constant temperature until it reached constant weight. The final board weight and nail pull resistance were then measured. The results are shown in Table VI.

TABLE VI

| Example | Starch (wt. % based on stucco) | Board Weight (lbs/1000 ft²) | Nail Pull Resistance (lbs. Force) |
|---|---|---|---|
| Control | 0.5 | 1635 | 77.0 |
| 1 | 2.3 | 1470 | 81.4 |
| 2 | 2.1 | 1467 | 80.7 |
| 3 | 2.0 | 1451 | 79.7 |
| 4 | 2.1 | 1509 | 81.1 |
| 5 | 2.1 | 1564 | 78.8 |

These results show that wallboards which are prepared in accordance with the invention exhibit equivalent or higher overall strength (nail pull resistance) compared with the control wallboard while simultaneously providing a lighter weight wallboard. Variations in board weight and nail pull are attributed to differences in quality of the stucco used due to gypsum source.

Example 13

Process Plant Preparation Using TAM Stucco

The same process as described in Example 5 was performed, except this wallboard was prepared in the process plant and formed into full sheets. Six control boards were made without any additional, excess starch, or the addition of additional low-density foam solution. These control boards were then compared with several test boards made in accordance with the invention. The relative amounts (pounds/MSF) of added ingredients in the test boards are shown in Table VII below.

TABLE VII

| Ingredient | Sample 1 | Sample 2 | Sample 3 | Sample 4 | Sample 5 |
|---|---|---|---|---|---|
| Stucco | 1392.12 lb | 1408.12 lb | 1414.12 lb | 1406.12 lb | 1416.12 lb |
| BMA | 7.80 lb | 7.80 lb | 7.80 lb | 7.80 lb | 7.80 lb |
| Starch | 25 lb | 25 lb | 25 lb | 25 lb | 25 lb |
| Pulp Sol'n | 190 lb | 190 lb | 190 lb | 190 lb | 190 lb |
| Pulp $H_2O$ | 300 lb | 300 lb | 300 lb | 300 lb | 300 lb |
| Foam Agent | 0.96 lb | 0.96 lb | 0.96 lb | 0.96 lb | 0.96 lb |
| Foam $H_2O$ | 530 lb | 530 Lb | 530 lb | 530 lb | 530 lb |
| Potash | 2.18 lb | 2.18 lb | 2.18 lb | 2.18 lb | 2.18 lb |
| $H_2O$-reducer | 3.00 lb | 3.00 lb | 3.00 lb | 3.00 lb | 3.00 lb |

As in the previous Examples, the produced boards were evaluated for nail pull and bond percent at 90° F./90% relative humidity. The results are provided in Table VIII, wherein the board weight is pounds/MSF of half-inch board. The values for both the control boards and the experimental boards represent the averages of six control runs.

TABLE VIII

| Board | Board Weight | Nail Pull (lbs. Force) | % Bond @ 90/90 |
|---|---|---|---|
| Control | 1666 | 79.1 | 47.0 |
| 1 | 1516 | 82.6 | 100 |
| 2 | 1532 | 80.8 | 78 |
| 3 | 1538 | 80.8 | 92 |
| 4 | 1530 | 80.4 | 89 |
| 5 | 1540 | 87.0 | 100 |
| Average of 1–5 | 1531 | 82.3 | 93.2 |

Other modifications of the wallboard were also prepared in the process plant trials, such as varying the amounts of excess starch added and the water-to-stucco (w/s) ratio in accordance with the present invention. These results, as well as the resultant strength characteristics as evaluated by the nail pull test and the paper to core test (Example 4) are shown in Table IX, wherein the board weight is pounds/MSF of half-inch board.

TABLE IX

| Board | Wt. % starch | water: stucco ratio (w/s) | Board Wt. (lb/MSF) | Avg. % Peel | Plant Nail Pull | ASTM Nail Pull |
|---|---|---|---|---|---|---|
| Control 1 | 0.5 | 0.77 | 1672 | 41 | 80.4 | 71.3 |
| Control 2 | 0.5 | 0.77 | 1672 | 67 | 78.2 | 70.9 |
| Control 3 | 0.5 | 0.77 | 1656 | 60 | 75.2 | 68.5 |

TABLE IX-continued

| Board | Wt. % starch | water: stucco ratio (w/s) | Board Wt. (lb/MSF) | Avg. % Peel | Plant Nail Pull | ASTM Nail Pull |
|---|---|---|---|---|---|---|
| Control 4 | 0.5 | 0.77 | 1688 | 38 | 82.8 | 84.5 |
| Control 5 | 0.5 | 0.77 | 1688 | 48 | 82.6 | 77.6 |
| Control 6 | 0.5 | 0.77 | 1617 | 27 | 75.2 | 77.0 |
| Excess starch 1 | 1.6 | 0.79 | 1648 | 17 | 81.8 | 82.7 |
| Excess starch 2 | 1.7 | 0.79 | 1625 | 17 | 85.8 | 80.2 |
| Excess starch 3 | 1.7 | 0.80 | 1625 | 3 | 79.2 | 75.8 |
| Excess starch 4 | 1.7 | 0.80 | 1609 | 6 | 80.8 | 75.0 |
| Excess starch 5 | 1.7 | 0.80 | 1609 | 14 | 82.8 | 77.0 |
| Excess starch 6 | 1.8 | 0.81 | 1547 | 1 | 74.0 | 71.6 |
| Excess starch 7 | 1.7 | 0.80 | 1609 | 2 | 87.2 | 85.2 |
| Excess starch 8 | 1.7 | 0.80 | 1625 | 17 | 84.6 | 85.7 |
| Excess starch 9 | 1.8 | 0.80 | 1516 | 18 | 79.6 | 77.2 |
| Excess starch 10 | 1.8 | 0.80 | 1500 | 42 | 75.0 | 72.3 |
| Excess starch 11 | 1.8 | 0.80 | 1531 | 7 | 78.8 | 71.6 |
| Excess starch 12 | 1.9 | 0.80 | 1469 | 14 | 79.2 | 68.5 |
| Excess starch 13 | 1.9 | 0.80 | 1469 | 35 | 76.8 | 78.1 |
| Excess starch 14 | 1.9 | 0.80 | 1516 | 20 | 79.6 | 77.2 |
| Excess starch 15 | 1.8 | 0.80 | 1547 | 33 | 82.0 | 79.0 |
| Excess starch 16 | 1.8 | 0.80 | 1545 | 21 | 77.4 | 79.2 |
| Excess starch 17 | 1.8 | 0.80 | 1563 | 20 | 75.2 | 79.3 |
| Excess starch 18 | 1.8 | 0.80 | 1557 | 16 | 78.0 | 75.9 |

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A lightweight wallboard core slurry composition comprising:
   calcium sulfate hemihydrate;
   starch;
   foam; and
   water, wherein:
      the starch is present at about 1.5 weight percent to about 3.0 weight percent, based on the amount of calcium sulfate hemihydrate;
      the water-to-stucco weight ratio is about 0.7 to about 0.95; and
      the slurry contains air bubbles.

2. The composition of claim 1, wherein the calcium sulfate hemihydrate is the beta form of calcium sulfate hemihydrate.

3. The composition of claim 1, wherein the calcium sulfate hemihydrate is present at about 30 weight percent to about 60 weight percent of the slurry composition.

4. The composition of claim 1, wherein the starch is present at about 2.0 weight percent to about 3.0 weight percent, based on the amount of calcium sulfate hemihydrate.

5. The composition of claim 1, wherein the starch is present at about 1.7 weight percent to about 2.5 weight percent, based on the amount of calcium sulfate hemihydrate.

6. The composition of claim 1, wherein the starch is present at about 2.1 weight percent, based on the amount of calcium sulfate hemihydrate.

7. The composition of claim 1, wherein the starch is uncooked.

8. The composition of claim 1, wherein the starch comprises cooked starch.

9. The composition of claim 1, wherein the weight ratio of water to calcium sulfate hemihydrate is about 0.8 to about 0.9.

10. The composition of claim 1, wherein the foam comprises at least one foaming agent.

11. The composition of claim 10, wherein the foaming agent comprises at least two ammonium alkyl sulfonates.

12. The composition of claim 10, wherein the at least one foaming agent is present at about 20 weight percent to about 40 weight percent, based on the amount of calcium sulfate hemihydrate.

13. The composition of claim 10, wherein the at least one foaming agent is present at about 30 weight percent to about 40 weight percent, based on the amount of calcium sulfate hemihydrate.

14. The composition of claim 1, wherein the foam is present at about 20 weight percent to about 40 weight percent, based on the amount of calcium sulfate hemihydrate.

15. The composition of claim 14, wherein the foam is present at about 30 weight percent to about 40 weight percent, based on the amount of calcium sulfate hemihydrate.

16. The composition of claim 1, wherein the foam has a density of about 7.9 pounds/ft$^3$ (126.5 kg/m$^3$) to about 20 pounds/ft$^3$ (320 kg/m$^3$).

17. The composition of claim 1, wherein the foam has a density of about 8.0 pounds/ft$^3$ (128 kg/M$^3$) to about 9.5 pounds/ft$^3$ (152 kg/m$^3$).

18. The composition of claim 1, wherein the air bubbles have an average diameter of about 300$\mu$ to about 500$\mu$.

19. The composition of claim 1, wherein the air bubbles have an average diameter of about 300$\mu$ to about 400$\mu$.

20. The composition of claim 1, further comprising a water reducer, a set retarder, a set accelerator, or paper fibers.

21. A lightweight construction grade wallboard comprising:
   a core comprising calcium sulfate hemihydrate, starch, foam, and water;
   a first cover sheet; and
   a second cover sheet, wherein:
      the starch is present at about 1.5 weight percent to about 3.0 weight percent based on the weight of calcium sulfate hemihydrate;
      the core is surfaced on the top and bottom by the first sheet and the second sheet; and
      the wallboard has a density of about 1450 pounds per thousand square feet for a half inch thick board to about 1560 pounds per thousand square feet for a half inch thick board.

22. The wallboard of claim 21, wherein the first cover sheet and second cover sheet each comprise paper.

23. The wallboard of claim 21, having a nail pull value of at least about 77 pounds of force.

24. A gypsum wallboard panel comprising:
   a first paper coversheet;
   a second paper coversheet; and
   a core disposed between the first coversheet and the second coversheet, wherein:

the core comprises calcium sulfate hemihydrate, starch, and air bubbles;

the starch is present in an amount of about 2.1 weight percent of the amount of calcium sulfate hemihydrate;

the average diameter of the air bubbles is about $300\mu$ to about $500\mu$; and the core has a density of about 1450 pounds per thousand square feet for a half inch thick board to about 1560 pounds per thousand square feet for a half inch thick board.

25. The panel of claim 24, having a nail pull value of at least about 77 pounds of force.

26. A method of preparing lightweight wallboard, the method comprising:

forming a slurry comprising water, calcium sulfate hemihydrate, starch, and foam to form a slurry containing air bubbles, wherein the slurry comprises at least about 30 weight percent calcium sulfate hemihydrate and the starch is present at about 1.5 weight percent to about 3.0 weight percent based on the amount of calcium sulfate hemihydrate;

depositing the slurry on a first sheet of face paper;

applying a second sheet of face paper on the slurry to form a wallboard having a lightweight core; and drying the wallboard;

wherein the dried wallboard has a density of about 1450 pounds per thousand square feet for a half inch thick board to about 1560 pounds per thousand square feet for a half inch thick board.

27. The method of claim 26 wherein the slurry is homogeneous.

28. The method of claim 26 wherein the weight ratio of water to calcium sulfate hemihydrate is about 0.7 to about 0.95.

29. The method of claim 26, wherein the starch is present at about 1.7 weight percent to about 2.5 weight percent, based on the amount of calcium sulfate hemihydrate.

30. The method of claim 26, wherein the starch is present at about 2.1 weight percent, based on the amount of calcium sulfate hemihydrate.

31. The method of claim 26, further comprising cooking at least a portion of the starch prior to the forming step.

32. The method of claim 31, wherein a least a portion of the starch is cooked by heating a slurry of water and starch to about 165° F. (74° C.).

33. The method of claim 26, wherein the foam comprises at least one foaming agent.

34. The method of claim 33, wherein the foaming agent comprises at least two ammonium alkyl sulfonates.

35. The method of claim 33, wherein the at least one foaming agent is present at about 20 weight percent to about 40 weight percent, based on the amount of calcium sulfate hemihydrate.

36. The method of claim 33, wherein the at least one foaming agent is present at about 30 weight percent to about 40 weight percent, based on the amount of calcium sulfate hemihydrate.

37. The method of claim 26, wherein the foam is present at about 20 weight percent to about 40 weight percent, based on the amount of calcium sulfate hemihydrate.

38. The method of claim 26, wherein the foam is present at about 30 weight percent to about 40 weight percent, based on the amount of calcium sulfate hemihydrate.

39. The method of claim 26, wherein the foam has a density of about 7.9 pounds/ft$^3$ (126.5 kg/m$^3$) to about 20 pounds/ft$^3$ (320 kg/m$^3$).

40. The method of claim 26, wherein the foam has a density of about 8.0 pounds/ft$^3$ (128 kg/m$^3$) to about 9.5 pounds/ft$^3$ (152 kg/m$^3$).

41. The method of claim 26, wherein the air bubbles have an average diameter of about $300\mu$ to about $500\mu$.

42. The method of claim 26, wherein the air bubbles have an average diameter of about $300\mu$ to about $400\mu$.

43. The method of claim 26, further comprising adding a water reducer, a set retarder, a set accelerator, or paper fibers to the slurry.

* * * * *